Figure 1:
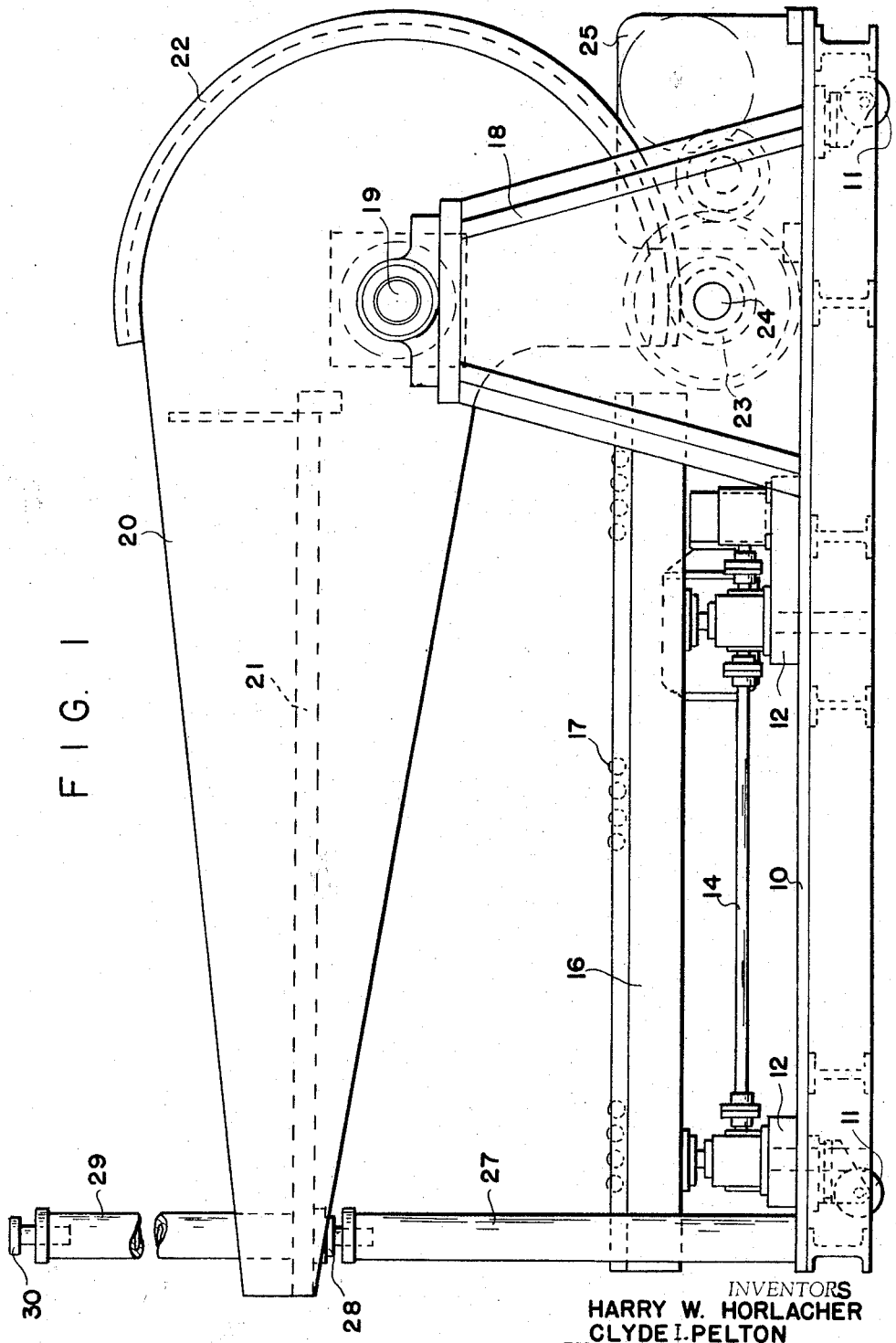

INVENTORS
HARRY W. HORLACHER
CLYDE I. PELTON
BY
ATTORNEY

United States Patent Office 3,303,558
Patented Feb. 14, 1967

3,303,558
DIE MANIPULATOR
Harry W. Horlacher and Clyde I. Pelton, Warren, Ohio, assignors to The Taylor-Winfield Corporation, Warren, Ohio, a corporation of Ohio
Filed Dec. 29, 1964, Ser. No. 421,971
5 Claims. (Cl. 29—239)

This invention relates to press room equipment, and more particularly to mobile apparatus for moving metal forming and/or punching die sets into and out of presses and for conveniently handling the removed sets to facilitate adjustment, change, repair and maintenance thereof. While not particularly limited in its application to such uses, the invention has its greatest usefulness in the manipulating or handling of large die sets which may approach 8–10 tons in weight and 7' by 10' in plan. This is ponderous tooling, requiring safe and precise handling equipment, while presenting serious problems when it is desired to change and/or rework the die for making a different product in the same press without overly extending the unproductive "down time" of the press.

The primary object of the invention is the provision of an improved mobile die manipulator which is operative to receive a die set, whether of small or very large size, from a press, to open and close the die set for checking purposes, and to expose the working parts of the die in a much safer and improved manner whereby the changing, adjustment, repair and maintenance of the die will be materially facilitated. It will be understood by those skilled in the manufacturing art that is rather common practice to design large and costly dies with interchangeable inserts to make products of different sizes or specifications. It is desirable that the change-overs be accomplished in short periods of time so as not to unduly prolong the "down time" of the press. Ordinarily, it is not practical to work on the dies in the press because of lack of clearance, and inversion of the working parts attached to the upper platen of the die set, etc. The apparatus of this invention is accordingly so constructed that the die set may be quickly removed horizontally from the press and then opened up so that the working parts of both the top and bottom sections of the die are exposed upwardly at a convenient working height and in side-by-side relation so that both the top and bottom sections of the die may be worked on simultaneously.

A further object of the invention is the provision of a die manipulator having the desirable operating characteristic outline above which utilizes a common mechanism not only to adjust the die set supporting platen of the manipulator precisely to the bed height of the press to facilitate loading and unloading of the die but also to open and close the die set when removed from the press to facilitate disassembly, assembly, checking, etc.

A further object of the invention is to provide a die manipulator having the characteristics enumerated above which is rugged and compact in arrangement, requiring a minimum of floor space when not in use or when transporting closed and completed die sets, and which operates with greater safety when moving and manipulating the die sets. As regards the latter feature, the apparatus of the invention maintains the center of gravity of the heavy die sets and components close to the factory floor when transporting and manipulating the sets and, as stated above, presents the opened working parts of the sets at a convenient upwardly facing height which is obviously the safest arrangement.

The above and other objects and advantages of the invention will become apparent upon consideration of the following specification and the accompanying drawing wherein there is disclosed a preferred embodiment of the invention.

Figure 2:
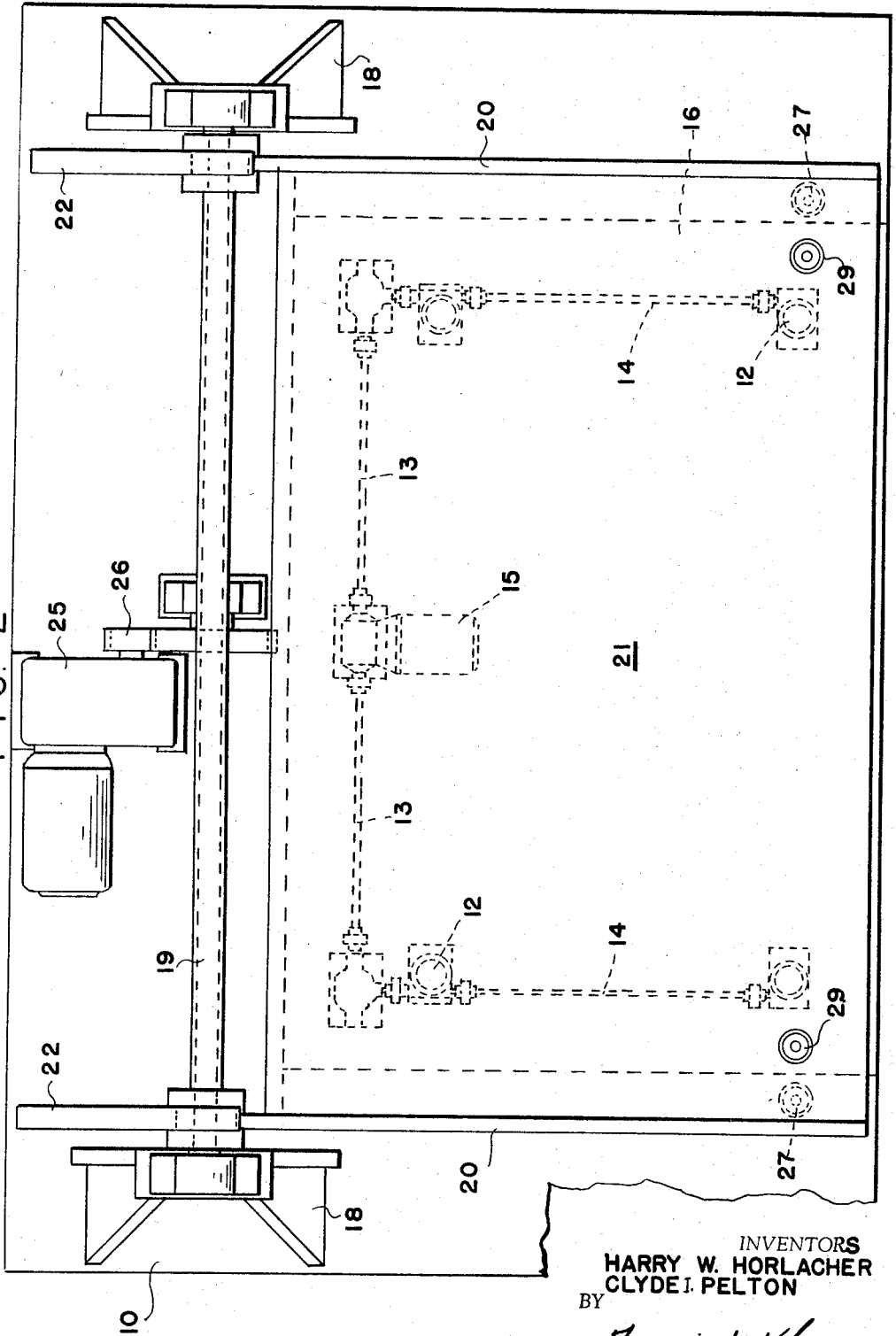
Figure 3:
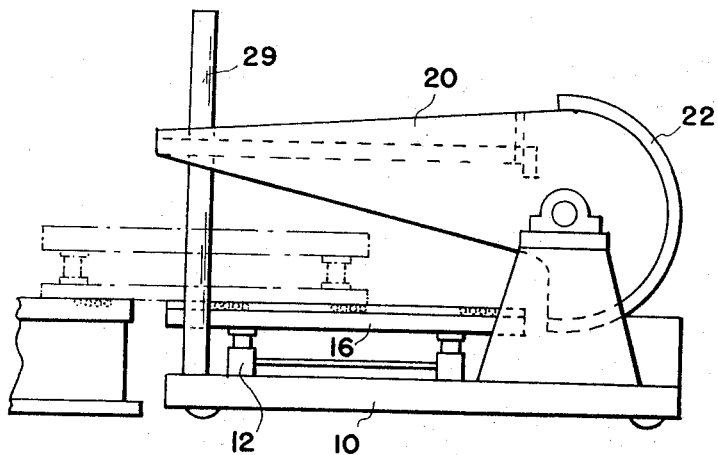
Figure 4:
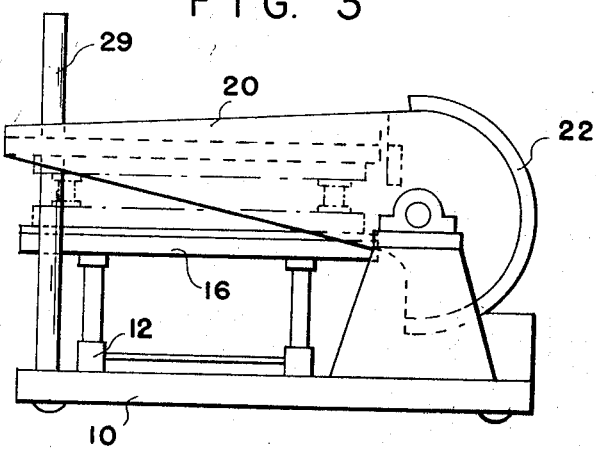
Figure 5:
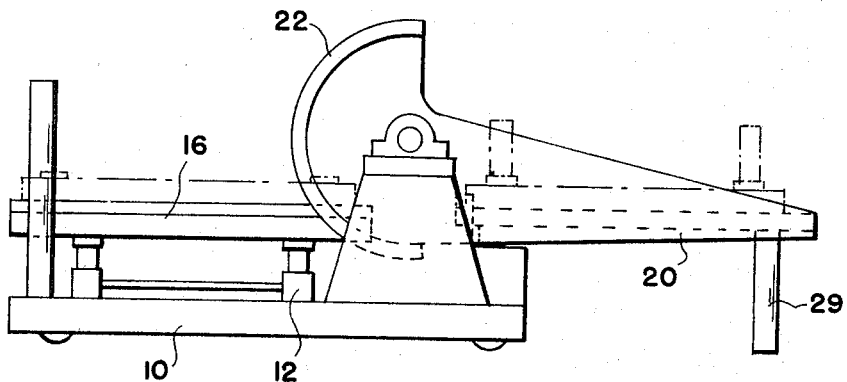

In the drawing:
FIGURE 1 is a side elevation of a die manipulator constructed in accordance with the principles of the present invention;
FIGURE 2 is a plan view of the apparatus of FIGURE 1;
FIGURE 3 is a side elevation of the apparatus of FIGURE 1 illustrating the transfer of a die from the bed of a press onto the manipulator of the invention or vice versa;
FIGURE 4 is a side view of the manipulator of the invention showing a removed die elevated for joining onto the upper platen of the manipulator; and
FIGURE 5 is a view of the manipulator of the invention opened up to facilitate working on removed and opened die.

In the drawing, reference numeral 10 designates a heavy, flat base which is movably supported on a plurality of heavy-duty swivel casters 11 to lend mobility to the assembly about the press room. Rigidly supported on the base 10 are a plurality of spaced lifting jacks 12 which are preferably of the worm gear type, and which are mechanically interconnected by drive shafts 13 and 14 for synchronous actuation in opposite directions by a motor-actuated reducing drive 15. The jacks 12 support a bottom platen 16 and serve to raise and lower this platen, as will be understood, the heft and power of the jacks being sufficient to support the platen 16 and any die set which may be received thereon and to raise and lower the assembly of the platen and die set as desired. Partially recessed within the upper surface of the platen 16 are a plurality of rolls 17 which facilitates the sliding movement of the die set on the platen 16 as will be understood by those familiar with the art. In actual practice, the platen 16 is additionally provided with conventional T-slots, thru-slots and/or apertures, all not shown, whereby the base sections of the die sets may be lagged unmovably on the platen 16.

A heavy pedestal-like support 18 extends upwardly from either side edge of the base 10 adjacent one end thereof, these supports 18 being welded or otherwise very rigidly connected to the base 10. Journaled on the supports 18 and positioned in spanning relation to the two supports is a heavy shaft 19 on which is affixed a pair of plate-like arms 20 each having a forwardly extending nose and a rearwardly directed semi-circular bulbous portion, all as shown in FIGURES 1 and 3–5. Spanning the forward portions of the arms 20 and rigidly connected thereto is an upper platen 21 having at least a flat bottom surface. Again, in actual practice, the platen 21 will have conveniently disposed T-slots (on its bottom surface) and/or thru-slots or apertures, all not shown herein, whereby the upper sections of the die sets may be lagged onto the platen 21 and held immobile with respect thereto.

The peripheral surfaces of the rear semi-circular portions of the arms 20 are formed with gear teeth shown schematically at 22. These mesh with pinion gears 23 which are keyed onto a heavy shaft 24, also spanning and journaled in the supports 18. Shaft 24 is slowly driven in opposite directions by a motor reducer 25 acting through gear reduction 26. Because of the ponderous weights which are sometimes handled, the speed reduction to shaft 24 is such as to make the shaft 24 rotate at a very low incremental speed.

In order that the upper platen 21 may be automatically brought into parallelism with the lower platen 16 of the die manipulating equipment, we provide a pair of adjustable leveling standards 27 which are mounted on the side edge portions of the base 10 outwardly of the platen 16, as shown in FIGURES 1 and 2. The standards for post 27 are adjustable as to height in the sense that each has a cap 28 which is screw-threadably connected with the top portion of the column. Obviously, these caps may be individually adjusted so that as the platen 21 is swung to horizontal position this platen will be parallel with the bottom platen 16, not only front to back but also from side to side so that when the top and bottom sections of the die sets are lagged to the platens 21 and 16 for the purpose to be described hereinafter, there will be no binding in the die sets and the same may be readily opened and closed, comparable to the action in the press.

Rigidly connected to and extending upwardly from the upper surface of the platen 21 is a pair of adjustable posts 29, each having a screw-threaded adjustment cap 30. These posts 29 and 30 are provided so that when the arms 20 are rotated 180° to the positions indicated in FIGURE 5, the outer free end of the arms 20 as well as the outer portion of the platen 21 and the die section or sections lag thereto will be supported directly on the floor of the press room or die shop in an entirely stable manner.

Considering now the operation of the apparatus above described, and referring first to FIGURE 3, it will be noted that the manipulator can be readily maneuvered into adjacent and parallel relation to the bed of a press which is shown in full lines in the figure to the left of the manipulator. By energizing the jacks 12, the lower platen 16 can be raised or lowered, as required, to bring its supporting surface to the precise same elevation as the top supporting surface of the press bed. This allows a die to be readily moved horizontally from the bed of the press onto the platen 16, a representative die being shown in FIGURE 3 in dashed outline and in the process of being transferred from the press bed to the platen 16 of the manipulator. After being secured to the platen 16 by any suitable means such as by headed bolts, not shown, which are received in the above referenced T-slots, also not shown, the jacks 12 are again energized to raise the die and platen 16 up into contact with the bottom surface of the upper platen 21 which is carried by the arms 20. As explained above, in connection with FIGURE 1, the adjustable posts 27, 28 permit the upper platen 21 to be precisely located parallel to the upper supporting surface of the platen 16. The upper section of the die is now bolted or otherwise rigidly secured to the upper platen 21 after which the lower platen carrying the bottom section of the die may be dropped to separate the die. For checking, minor repairs, adjustment, and/or lubrication, this initial separation of the die may be sufficient but usually it will be desirable to energize the motor 25 to swing the arms 20 approximately 180° to the positions shown in FIGURE 5.

With the die fully opened and firmly supported close to the floor with both working faces of the die sections projecting upwardly the die is in the safest and most advantageous position for being worked on, which working may comprise sharpening, fitting, and interchanging of parts or locations thereof, all of which will be familiar to those familiar with the art. If the component parts of the die to be handled are heavy the upwardly facing relation and the low elevation of the die plates or bolsters is most advantageous as enabling these components to be handled in a safe and expeditious manner by overhead handling equipment as will be understood. Assuming the plates or bolsters of the die set to be rigidly clamped to the platens of the manipulator, it will be obvious that the desired relative position of these base members as well as of the guide pins and bushings will be retained even though considerable work is being done on the die sections. After this work is completed, the arms 20 may be swung back into positions shown in FIGURE 4 after which the platen 16 bearing the lower section of the die may be raised to re-engage the guide pins with the bushings and to check the action of the repaired or altered die. At the completion of this and the full closing of the die, the upper section of the die is disengaged from the upper platen of the manipulator which is carried by the arms 20 and thereafter the platen 16 lowered to horizontally align the die with the particular press in which it is to be installed.

A singular advantage of the apparatus of the invention is that the floor space required for the apparatus need not ordinarily be much larger than the plan dimensions of the dies to be handled. When receiving a die from a press or reinstalling a die in a press, or when simply checking a die or when transporting the same to or from the die shop, the apparatus of the invention is nested or compacted as shown in FIGURES 1 thru 4. This does not consume excessive aisle space nor does it require wide aisles in passage between different presses or between the presses and die shop. Further, the center of gravity of the whole assembly, whether or not including a loaded die, is always quite close to the floor so that there is no danger of overturning or interference with loads traveling overhead. The device, moreover, is completely portable, and does not require any restraints when being opened up to the position shown in FIGURE 5 since the concentration of weight to the left of the right casters shown in this figure is always much greater than the cantilevered weight of the arms 20 and the loads carried thereby.

Having thus described our invention what we claim is:

1. A portable die receiver and manipulator comprising a caster-supported base adapted to be brought into proximity with the bed of a press, a horizontally disposed die-receiving platen supported on said base and guided thereon for vertical up and down movement, power means carried by said base to raise and lower said platen, a support carried by said base for rotation about an axis spaced above and adjacent to an end portion of said platen, a second platen rigidly carried by said support and adapted to be brought into a parallel position above said first mentioned platen when said support is rotated to one of its positions, and power means carried by said base for rotating said support whereby said second platen may be opened away from said first mentioned platen, the arrangement being such that top and bottom sections of a die may be secured, respectively, to said second and first mentioned platens after which said first mentioned platen may be lowered to open the die and permit said support and second platen carried thereby to swing the top section of the die away from the bottom portion thereof.

2. Apparatus according to claim 1 further including a post supported in upstanding relation on said base outwardly of the vertical path of travel of said first mentioned platen, said post being adjustable as to height and positioned so as to be effectively engaged by said upper platen whereby upon rotation of said support to the said one of its positions said second platen may be automatically stopped in exact parallelism with said first mentioned platen.

3. Apparatus according to claim 1 further including an upstanding post rigidly connected to the outer free end of said support, said post being operative to engage the floor supporting the apparatus when said support and upper platen is swung far away from said lower platen, the arrangement being such that said post is operative to support a substantial portion of the weight of the support, upper platen, and a die section which may be secured to said upper platen.

4. Apparatus according to claim 1 further characterized in that said support includes an arcuate rack gear disposed concentrically of said axis on the opposite side thereof from said upper platen, and a power-driven pinion gear engaging said rack gear.

5. Apparatus according to claim 1 further including die-supporting rolls partially embedded in the top face of said first mentioned platen, said rolls being operative to anti-frictionally support the die as the same is slid onto or off of said first mentioned platen from or to the bed of a press.

References Cited by the Examiner

UNITED STATES PATENTS

| | | | |
|---|---|---|---|
| 1,097,924 | 5/1914 | Hunter | 100—226 X |
| 1,859,446 | 5/1932 | Janiszewski | 29—239 X |
| 3,204,292 | 9/1965 | Schon | 100—299 |

FOREIGN PATENTS 990,016  4/1965  Great Britain.

WILLIAM FELDMAN, *Primary Examiner.*

J. C. PETERS, *Assistant Examiner.*